United States Patent [19]

Brooks

[11] E

Patent Number: Re. 31,767

[45] Reissued Date of Patent: Dec. 18, 1984

[54] METHOD AND APPARATUS FOR MAKING SHAPED ARTICLES FROM SPRAYED MOLTEN METAL OR METAL ALLOY

[75] Inventor: Reginald G. Brooks, Glamorgan, Wales

[73] Assignee: Osprey Metals Limited, Neath, Wales

[21] Appl. No.: 360,050

[22] Filed: Mar. 19, 1982

Related U.S. Patent Documents

Reissue of:

[64] Patent No.: 3,909,921
Issued: Oct. 7, 1975
Appl. No.: 486,919
Filed: Jul. 9, 1974

U.S. Applications:

[63] Continuation-in-part of Ser. No. 297,866, Oct. 16, 1972, Pat. No. 3,826,301.

[30] Foreign Application Priority Data

Oct. 26, 1971 [GB] United Kingdom ..... 49646/71
Jun. 6, 1972 [GB] United Kingdom ..... 26307/72

[51] Int. Cl.[3] ..... B22D 23/00

[52] U.S. Cl. ..... 29/527.2; 29/527.5; 29/DIG. 39; 164/46; 164/76.1

[58] Field of Search ..... 29/527.5, 527.2, DIG. 39, 29/527.6; 164/76.1, 271, 269, 270.1, 46, 270.1, 76.1, 269, 271

[56] References Cited

U.S. PATENT DOCUMENTS

| | | | |
|---|---|---|---|
| 1,705,214 | 3/1929 | Versteeq | 118/300 X |
| 2,307,939 | 1/1943 | Merle | 164/46 X |
| 2,701,775 | 2/1955 | Brennan | 118/302 X |
| 3,397,732 | 8/1968 | Howell | 164/46 |
| 3,670,400 | 6/1972 | Singer | 29/527.5 |
| 3,689,987 | 9/1973 | Teague | 29/527.2 |
| 3,696,502 | 10/1973 | Darling | 29/527.7 |
| 3,742,585 | 7/1973 | Wentzell | 164/46 X |
| 3,775,156 | 11/1973 | Singer | 118/302 X |
| 3,826,301 | 7/1974 | Brooks | 164/46 |
| 4,114,251 | 9/1978 | Southern et al. | 164/46 |

FOREIGN PATENT DOCUMENTS 2043882 3/1971 Fed. Rep. of Germany .

OTHER PUBLICATIONS

Singer, A. R. E., "The Principles of Spray Rolling of Metals," *Metals & Materials*, 1970, vol. 4, pp. 246–250.

*Primary Examiner*—Howard N. Goldberg
*Assistant Examiner*—V. K. Rising
*Attorney, Agent, or Firm*—Burns, Doane, Swecker & Mathis

[57] ABSTRACT

A method and apparatus for manufacturing a shaped precision article from molten metal or molten metal alloy wherein a gas atomized stream of molten metal or molten metal alloy is directed at a collecting surface to form a coherent deposit, the stream being cooled in flight by the atomizing gas, which is at ambient, preferably room temperature, sufficient heat being extracted by the relatively cold atomizing gas from the stream of molten metal in flight such that formation of the coherent deposit is independent or substantially independent of the thermal properties and temperature of the collecting surface, provided the temperature of the collecting surface is below the melting point of the metal or metal alloy being sprayed; and the deposit is worked as by a die to form the precision metal or metal alloy article.

19 Claims, 4 Drawing Figures

METHOD AND APPARATUS FOR MAKING SHAPED ARTICLES FROM SPRAYED MOLTEN METAL OR METAL ALLOY

Matter enclosed in heavy brackets [ ] appears in the original patent but forms no part of this reissue specification; matter printed in italics indicates the additions made by reissue.

This is a continuation-in-part of my copending application Ser. No. 297,866 filed Oct. 16, 1972, now U.S. Pat. No. 3,826,301.

This invention relates to a method for manufacturing metal, or metal alloy, articles of precise shape which may require only a small amount of finish machining and/or heat treatment. By the means of this invention articles of complex shape in three dimensions can be produced, e.g. gears, levers, cutting tools, impeller blades, rocker-arms, etc. Currently such articles are usually produced either by the drop-forging process or by powder metallurgical means. In either case many, and often expensive, process operations are required to convert molten metal into a finished forged article.

A known method of manufacturing such articles comprises pouring the molten metal, or metal alloy, through a hole in the base of a heated, refractory tundish (or through a hole in the base of the melting furnace), atomising the stream of molten metal by means of high velocity jets of gas (e.g. nitrogen, argon, etc.) and directing the resultant spray of metal particles at a suitably shaped collecting surface or die, to form a coherent deposit of hot metal particles, which is then worked in that die to produce a precision article.

One problem of spray depositing a high melting point metal e.g. melting temperature greater than 600° C. is that of obtaining an effectively uniform microstructure and an effectively uniform temperature throughout the deposit so that it can be successfully hot worked. If a spray of molten particles impacts a heavy relatively cold (or cooled) mould an ingot can be slowly built up in which the particles essentially retain their identity. In many practical instances, however, a thick deposit of particles must be rapidly built up particularly when producing preforms suitable for common hot forgings such as gear blanks, picks, hammers, hubs etc. In such circumstances heat cannot be transferred from the deposit to the cold, or cooled, collecting surface at a rate sufficient to retain and effectively uniform microstructure and this results in gradation of both grain size and temperature across the thickness of the deposit.

In the present invention such problems are overcome by the removal of a critical amount of heat in flight by means of the relatively cold atomising gas such that coherent deposits of complex shape and of varying thickness can build up rapidly whilst retaining an effectively uniform microstructure.

Therefore, the structure and temperature of the sprayed deposit are effectively independent of the thermal properties or temperature of the collecting surface provided, of course, that it is not at a temperature in excess of the melting point of the hot metal particles.

The conditions of gas atomisation are so controlled that a critical amount of heat is extracted from the particles whilst in flight so that, on deposition, they are at a temperature at which, on impacting the collecting surface, they deform and weld together to form a strong and coherent deposit of hot metal. If a critical amount of heat is not extracted from the spray of metal particles and the particles are deposited at too high a temperature of liquid pool of molten metal can be formed. Conversely if the temperature of the particles, on deposition, is too low powder metal particles are formed which do not flatten readily and do not weld together on impacting the collecting surface. In either case a coherent deposit of sufficient strength and with a fine particulate metallurgical structure is not formed and, therefore, the subsequent forging, or like, operation cannot be carried out successfully without further process operations.

According to this invention, however, coherent deposits can be produced which are suitable for the manufacture of precision metal or metal alloy articles by means of forging, or pressing or extrusion operations. The preferred method of operation of this invention is to remove the sprayed deposit from the collecting surface, or die, and transfer it into the dies of a drop-forging hammer, or like machine, for the subsequent forming operation. Thus the sprayed deposit can be forged directly after deposition, without the addition of heat, or at some time later, either with or without the addition of heat. The great advantage of this method of operation is that relatively inexpensive deposition dies can be successfully used.

Prior methods are known which employ the spray depositing of metal particles to form only semi-finished products, notably small ingots and strip material: such products generally have to be subjected to further forming operations before finished articles are produced. By means of the present invention, however, individual, shaped metal articles of precise dimensions can be rapidly produced in a single forming operation.

Moreover, in a prior method for the production of metal shapes of long length and relatively thin section (e.g. strip material), it is essential that the cross-sectional geometry of the deposited layer closely resembles that of the product after it has been rolled, as slight variations can result in cracking of the product due to excessive tensile stresses. This is not the case in the present invention as compressive forces ensure that surplus deposited material flows out between the shaped dies during the forging, pressing or like forming operation and can then be removed, for example, by the shearing action of the two suitably designed dies as they are loaded against each other.

In a second known method, in which the spray depositing of metal particles is employed for the production of small, metal ingots only, the rapid solidification of the molten metal particles is limited by its dependence on the said collecting surface being cooled, or being of such thermal capacity, or both, that solidification is promoted. In the present invention, however, a critical, and controlled, amount of heat is extracted from the metal particles in flight by means of the relatively cold atomising gas, so that sprayed metal deposits of any thickness can be rapidly produced, whilst retaining an essentially uniform microstructure and temperature throughout the deposit.

One or more sprays of hot, metal particles may be employed to obtain the required rate of deposition and/or the required area of deposition. In those cases which involve several sprays, they may be employed to act either simultaneously, or consecutively to produce the required shape and mass of the sprayed deposit. These objectives may also be achieved by relative movements between the deposition die and the spray (or sprays) of hot, metal particles.

Articles can be produced in accordance with this invention in most ferrous or non-ferrous metals or alloys which can be melted and atomised; e.g. carbon steels, alloy steels, aluminium, aluminium alloys, brasses, and phosphor bronzes. In addition, articles can be fabricated from a mixture of metals which are not mutually soluble in the liquid state as is the case with some of the existing powder metallurgical methods.

In utilising the method of the invention, the mixing of the different metals can be achieved by spray depositing dissimilar metals either simultaneously, so that mixing of the particles occurs whilst they are in flight, or one after the other so that a sprayed deposit is produced with a structure with consists basically of layers of dissimilar metals. If desired, metallic and/or non-metallic powders, fibres, filaments or whiskers can be incoporated in the sprayed deposit during the deposition operation.

Two examples for the production of forged metal articles by means of this invention are given below:

EXAMPLE 1

A 3 inch dia. bevel gear was produced by means of the invention. Molten mild steel was poured through a 3/16 inch diameter ceramic nozzle at a rate of 23 lb/min. This metal stream was atomised by nitrogen gas at or just below room temperature flowing at a rate of 100 $ft^3$/min. (8 lb/min) so that axisymmetric conical spray of cooling metal particles was formed in an atomising chamber. A concave solid mild steel collecting die was placed in the spray at a distance of 11 inches from the atomiser. The particles which impacted the collecting die rapidly built up (at a rate of approximately 0.08 ins/sec) to make a preform weighing approximately 1.9 lb., having an effectively uniform microstructure, and suitable for forging. The preform was cooled in an inert nitrogen atmosphere, the temperature of the gas leaving the atomising chamber being about 500°. Subsequently it was reheated to 1,100° C. in a cracked ammonia atmosphere and forged to finished shape in one blow of 10,000 ft. lb. energy on a forging press.

The forged tensile properties of the gear shape produced by means of the invention were similar to those of one manufactured from a wrought bar billet of identical chemical composition as illustrated in the following table. The test gauge length was 1 inch.

| | Sprayed/Forged | Bar Billet |
|---|---|---|
| Yield Strength (t.s.i.) | 14.0 | 17.8 |
| Ultimate Tensile Strength (t.s.i.) | 28.1 | 28.1 |
| Elongation (%) | 34 | 33 |
| Reduction in area (%) | 55 | 55 |
| Hardness (D.P.H. No.) | 125 | 125 |

EXAMPLE 2

A 2½ inch diameter, ½ inch thick disc with a thick raised rim was produced by means of the invention in Type 304 stainless steel under similar atomising and forging conditions as in Example 1. The deposit weight was 0.9 lb. The tensile properties are given below in comparison with reported values for the conventionally forged Type 304 steel.

| | Sprayed/ Forged | Conventional Type 304 Stainless Steel |
|---|---|---|
| Gauge Length (inches) | 1 | 2 |
| 0.2% Yield Strength (t.s.i.) | 16 | 15.6 |
| Ultimate Tensile Strength (t.s.i.) | 40 | 38 |
| Elongation (%) | 65 | 55 |
| Reduction in area (%) | 65 | 65 |
| Hardness (D.P.H. No.) | 157 | 150 |

EXAMPLE 3

A thick disc similar to that in Example 2 was manufactured in an aluminium alloy (HE30). The molten alloy was poured at a temperature of 1,470° F. through a 3/16 inch bore ceramic nozzle at a rate of approximately 8 lb/min, and atomised by jets of nitrogen gas at or just below room temperature flowing at a rate of 54 $ft^3$/min (4.3 lb/min). The conical spray of cooling metal particles impacted a concave mild steel deposition die at a distance of 12 inches from the atomiser. The deposit rapidly built up to a weight of 5 ozs, and after removal from the deposition die, was forged in one blow.

After suitable heat-treatment the tensile properties of the forged disc were similar to those of one manufactured from wrought bar billet of identical chemical composition as illustrated below:

The test gauge length was 1 inch.

| | Spray/Forged | Bar Billet |
|---|---|---|
| 0.1% Proof Stream (t.s.i.) | 9.8 | 9.6 |
| Ultimate Tensile Strength (t.s.i.) | 16.5 | 16 |
| Elongation (%) | 19 | 20 |

The invention will be described further, by way of example, with reference to the accompaying drawings, in which.

Figure 1:
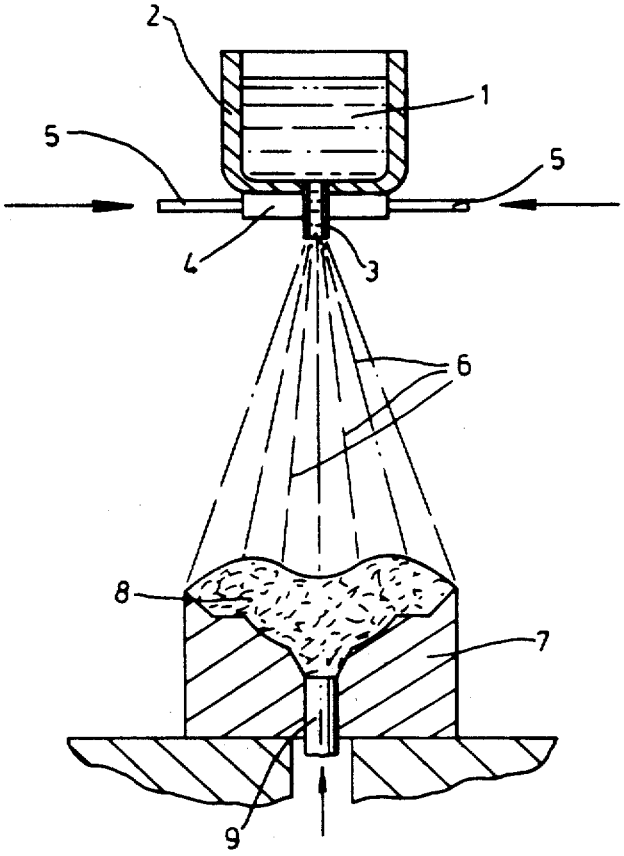
FIG. 1 is a diagrammatic elevation of apparatus for making shaped precision metal articles in accordance with the invention.
Figure 2:
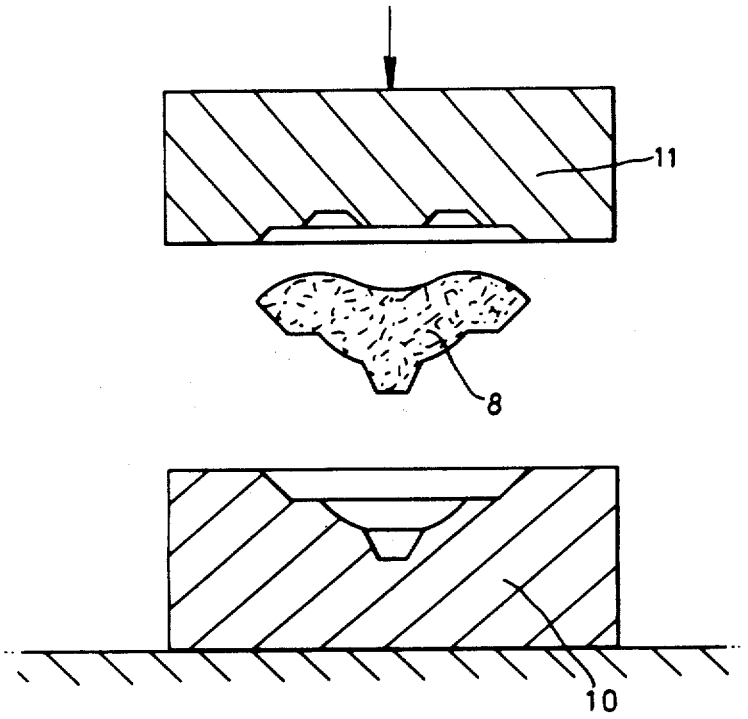
FIG. 2 is a sectional elevation through a drop-forging hammer for working the deposit produced in FIG. 1.
Figure 3:
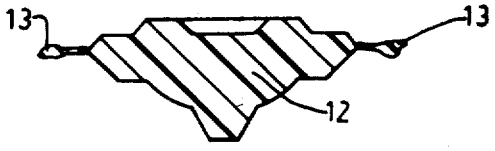
FIG. 3 shows the resultant forging produced by the drop-forging hammer of FIG. 2.
Figure 4:
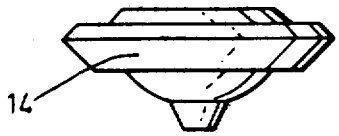
FIG. 4 shows the finished precision metal article.

Molten metal 1 is poured from a heated, refractory tundish 2, through a refractory nozzle 3 and is atomised and cooled by high velocity jets of nitrogen at or just below room temperature which issue from an atomising device 4 through which the molten metal stream is poured; the atomising gas enters the atomising device via delivery pipes 5. A critical amount of heat is extracted from the spray of metal particles 6 by controlling the conditions under which atomisation occurs (e.g. by variations in the atomising gas pressure; spray distance; diameter of molten metal stream, temperature of molten metal; mass ratio of atomising gas to sprayed metal, etc.) and the spray of hot metal particles is directed at the collecting surface, or die 7 where a hot, coherent and relatively strong deposit 8 is formed. After the deposition process has been completed the hot deposit can be removed from the collection die by means of an ejector 9. The deposit can then be transferred directly to the bottom die of a drop-forging hammer 10 and forged between the dies 10 and 11 to produce a forging 12 from which any surplus 'flash' material 13 can be trimmed off to produce a shaped and forged article 14. Alternatively the deposit, after removal from the deposition die, can be forged at some later time either with or without the addition of heat to produce a shaped and forged article.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of manufacturing a shaped precision article comprising the steps of directing a stream of molten metal or metal alloy onto a spaced collecting surface having a temperature appreciably less than the melting point of said metal or metal alloy, atomizing said stream by subjecting it to high velocity jets of an inert gas having an initial temperature that is appreciably less than that of said molten metal or metal alloy, said gas temperature being such that sufficient heat is extracted by said gas from said molten metal or metal alloy during flight to said surface that said deposited metal or metal alloy forms a coherent deposit and its formation is independent of the other thermal properties of said surface, and working said deposit by a die to form said article.

2. The method defined in claim 1, wherein said gas is mainly nitrogen at substantially ambient temperature.

3. The method defined in claim 2, wherein said gas is mainly nitrogen at room temperature.

4. The method as defined in claim 1, wherein said deposit is removed from the surface prior to said working.

5. Apparatus for manufacturing a shaped precision article comprising means for directing a stream of molten metal or metal alloy onto a spaced collecting surface having a temperature appreciably less than the melting point of said metal or metal alloy, means for atomizing said stream by subjecting it to high velocity jets of an inert gas having an initial temperature that is appreciably less than that of said molten metal or metal alloy, said gas temperature being such that sufficient heat is extracted by said gas from said molten metal or metal alloy during flight to said surface that said deposit is coherent and its formation independent of the other thermal properties of said surface, and means for working said deposit by a die to form said article.

6. The apparatus defined in claim 5, wherein said gas is mainly or wholly nitrogen at ambient temperature.

7. The apparatus defined in claim 6, wherein said gas is mainly or wholly nitrogen at room temperature.

8. The apparatus defined in claim 5, wherein said metal is steel which, prior to atomising, is at a temperature in the range of 2,500° F.–3,200° F. and said gas is mainly or wholly nitrogen at about 30°–90° F. before atomising and about 900° F. after cooling the metal spray.

9. The apparatus defined in claim 5, wherein said deposit is removed from said surface and said die is distinct from said surface.

*10. A method of manufacturing from molten metal or metal alloy a deposit which is subsequently worked to form a shaped precision article comprising the steps of directing a stream of molten metal or metal alloy onto a spaced collecting surface having a temperature appreciably less than the melting point of said metal or metal alloy, atomizing said stream into individual particles by subjecting it to high velocity jets of an inert gas having an initial temperature that is appreciably less than that of said molten metal or metal alloy, said gas temperature being such that a sufficient controlled amount of heat is extracted by said gas from said molten metal or metal alloy during flight to said surface, and there being relative movement between said stream and said surface, such that said particles deform and weld together so that the particles lose their individual identities to form a coherent deposit, the solidification of said deposit being independent of the thermal condition and thermal properties of said surface, and working said deposit by a die to form said article.*

*11. The method defined in claim 10, wherein the worked deposit is subjected to finish machining and/or heat treatment to form a finished article.*

*12. The method defined in claim 11, wherein said gas is mainly nitrogen at room temperature.*

*13. The method defined in claim 10, wherein said gas is mainly nitrogen at substantially ambient temperature.*

*14. The method defined in claim 10, wherein said deposit is removed from the surface prior to said working.*

*15. Apparatus for manufacturing from molten metal or metal alloy a deposit which is subsequently worked to form a shaped precision article comprising means for directing a stream of molten metal alloy onto a spaced collecting surface having a temperature appreciably less than the melting point of said metal or metal alloy, means for atomizing said stream into individual particles by subjecting it to high velocity jets of an inert gas having an initial temperature that is appreciably less than that of said molten metal or metal alloy, said gas temperature being such that as sufficiently by controlled amount of heat is extracted by said gas from said molten metal or metal alloy during flight to said surface that said particles deform and weld together so that the particles lose their individual identities to form a coherent deposit, the solidification of said deposit being independent of the thermal condition and thermal properties of said surface, and means for working said deposit by a die to form said article.*

*16. The apparatus defined in claim 15, wherein said gas is mainly or wholly nitrogen at ambient temperature.*

*17. The apparatus defined in claim 16, wherein said gas is mainly or wholly nitrogen at room temperature.*

*18. The apparatus defined in claim 15, wherein said metal is steel which, prior to atomizing, is at a temperature in the range of 2,500° F.–3,200° F. and said gas is mainly or wholly nitrogen at about 30°–90° F. before atomizing and about 900° F. after cooling the metal spray.*

*19. The apparatus defined in claim 15, wherein said deposit is removed from said surface and said die is distinct from said surface.*

* * * * *